(12) United States Patent
Russell et al.

(10) Patent No.: US 11,254,546 B2
(45) Date of Patent: *Feb. 22, 2022

(54) CARRIER CONFIGURED TO TRANSPORT VARIOUS SIZED OBJECTS

(71) Applicant: EAGLERAIL CONTAINER LOGISTICS, LLC, Chicago, IL (US)

(72) Inventors: Kevin Russell, Roanoke, VA (US); Glenn Luckinbill, Aurora, IL (US)

(73) Assignee: EagleRail Container Logistics, LLC, Chicago, IL (US)

(*) Notice: Subject to any disclaimer, the term of this patent is extended or adjusted under 35 U.S.C. 154(b) by 275 days.

This patent is subject to a terminal disclaimer.

(21) Appl. No.: 16/502,858

(22) Filed: Jul. 3, 2019

(65) Prior Publication Data

US 2020/0002138 A1    Jan. 2, 2020

Related U.S. Application Data

(63) Continuation of application No. 15/335,423, filed on Oct. 26, 2016, now Pat. No. 10,358,323.

(60) Provisional application No. 62/337,272, filed on May 16, 2016, provisional application No. 62/249,086, (Continued)

(51) Int. Cl.
 *B61B 3/02* (2006.01)
 *B66C 11/00* (2006.01)
 *B66C 19/00* (2006.01)

(52) U.S. Cl.
 CPC ............ *B66C 11/00* (2013.01); *B61B 3/02* (2013.01); *B66C 19/00* (2013.01); *Y02T 30/00* (2013.01)

(58) Field of Classification Search
 CPC .. B61B 3/00; B61B 3/02; B61B 10/00; B61B 10/02; B61B 13/00; B61B 13/04; B61B 15/00; B66C 11/00; B66C 19/00
 See application file for complete search history.

(56) References Cited

U.S. PATENT DOCUMENTS

| 3,091,188 A | 5/1963 | Graham |
| 3,606,053 A | 9/1971 | Whiteman |
| 3,812,987 A | 5/1974 | Watatani |

(Continued)

FOREIGN PATENT DOCUMENTS

| CN | 2871475 Y | 2/2007 |
| CN | 201037104 Y | 3/2008 |

(Continued)

OTHER PUBLICATIONS

First Office Action dated Jun. 1, 2020 in connection with Chinese Patent Application No. 2016800764864.

(Continued)

*Primary Examiner* — Robert J McCarry, Jr.
(74) *Attorney, Agent, or Firm* — Cook Alex Ltd.

(57) ABSTRACT

A motorized container carrier can be configured to travel along a suspended railway. The motorized container carrier can include at least one motorized trolley configured to move the motorized container carrier along the suspended railway. The motorized container carrier can include a plurality of end beams with container engagement devices configured to interact with containers of various lengths. In some embodiments, the container engagement devices are twist locks. The motorized container carrier can include a system of bumpers and/or guide wheels.

14 Claims, 13 Drawing Sheets

Related U.S. Application Data filed on Oct. 30, 2015, provisional application No. 62/246,535, filed on Oct. 26, 2015.

(56) References Cited

U.S. PATENT DOCUMENTS

| | | | |
|---|---|---|---|
| 3,861,315 A * | 1/1975 | Rypinski | B61D 3/20 104/18 |
| 4,059,194 A | 11/1977 | Barry | |
| 4,106,639 A | 8/1978 | Montgomery et al. | |
| 4,220,096 A | 9/1980 | Horowitz | |
| 4,318,346 A | 3/1982 | Sessum | |
| 4,791,871 A | 12/1988 | Mowll | |
| 4,841,871 A | 6/1989 | Leibowitz | |
| 4,872,798 A | 10/1989 | Ide | |
| 4,973,219 A | 11/1990 | Brickner et al. | |
| 5,016,542 A | 5/1991 | Mitchell | |
| 5,074,220 A | 12/1991 | Petersen | |
| 5,203,135 A | 4/1993 | Bastian | |
| 5,733,092 A | 3/1998 | Barry | |
| 5,775,866 A | 7/1998 | Tax et al. | |
| 6,089,164 A | 7/2000 | Ostick | |
| 6,269,904 B1 | 8/2001 | Morhaus | |
| 6,324,989 B1 | 12/2001 | Taylor et al. | |
| 6,685,418 B2 | 2/2004 | Takehara et al. | |
| 6,810,817 B1 | 11/2004 | James | |
| 7,028,618 B2 | 4/2006 | Wallner | |
| 7,246,559 B2 | 7/2007 | Stromberg | |
| 7,603,952 B2 | 10/2009 | Vetesnik | |
| 7,686,558 B2 | 3/2010 | Tian et al. | |
| 8,146,507 B2 | 4/2012 | Hess | |
| 8,292,032 B2 | 10/2012 | Knaak | |
| 8,375,865 B2 * | 2/2013 | Zayas | B61B 13/04 104/88.01 |
| 8,439,180 B2 * | 5/2013 | Zhang | B65G 63/025 198/369.5 |
| 10,155,633 B2 | 12/2018 | Heide et al. | |
| 10,358,323 B2 * | 7/2019 | Russell | B61B 3/02 |
| 10,507,846 B2 | 12/2019 | Meissner | |
| 2008/0213073 A1 | 9/2008 | Benedict et al. | |
| 2009/0078535 A1 | 3/2009 | Tabler | |
| 2009/0090267 A1 | 4/2009 | Bruns | |
| 2010/0219018 A1 | 9/2010 | Knaak | |
| 2013/0125778 A1 | 5/2013 | LaCabe | |

FOREIGN PATENT DOCUMENTS

| | | |
|---|---|---|
| CN | 101723244 A | 6/2010 |
| CN | 102229398 A | 11/2011 |
| CN | 102862906 A | 1/2013 |
| CN | 203006179 U | 6/2013 |
| CN | 103803409 A | 5/2014 |
| CN | 204038863 U | 12/2014 |
| CN | 204098952 U | 1/2015 |
| CN | 204098952 U | 1/2015 |
| CN | 104640793 B | 5/2015 |
| CN | 204701607 U | 10/2015 |
| CN | 101559824 A | 10/2019 |
| DE | 3621648 A1 | 1/1988 |
| DE | 19638578 A1 | 3/1998 |
| DE | 19812993 A1 | 10/1998 |
| JP | S61200829 U | 9/1986 |
| JP | S61200829 U | 12/1986 |
| JP | H0597251 A | 4/1993 |
| JP | H143329844 B2 | 9/2002 |
| JP | 2005257400 A | 9/2005 |
| JP | H172005257400 A | 9/2005 |
| JP | H252013256235 A | 12/2013 |
| WO | 2003104132 A1 | 12/2003 |
| WO | WO 2003104132 A1 | 12/2003 |
| WO | 2006083230 A1 | 8/2006 |
| WO | WO 2006083230 A1 | 8/2006 |
| WO | 2008046728 A1 | 4/2008 |
| WO | WO 2008046728 A1 | 4/2008 |
| WO | 2011137402 A | 11/2011 |
| WO | WO-2011137402 A | 11/2011 |
| WO | WO 2011137402 A | 11/2011 |

OTHER PUBLICATIONS

Second Office Action dated Feb. 18, 2020 in connection with Chinese Patent Application No. 2016800764756.
Modero: "Suspended Railways Mining Transport", TurboSquid 3D Models, Product ID 938317, Published Jun. 24, 2015, retrieved Sep. 1, 2015. <URL:http://www.turbosquid.com/3d-models/3d-model-of-suspended-railway-cargo-transport/938317>.
Naess, Olav: "The Beamway" Beamway Introduction, published 2006, retrieved Sep. 1, 2015. <URL: http://on-nor.net/beamwayintro.html>.
International Search and Written Opinion dated Feb. 23, 2017 in connection with PCT/US2016/058962.
International Search and Written Opinion dated Apr. 21, 2017 in connection with PCT/US2016/058963.
International Search and Written Opinion dated Aug. 28, 2017 in connection with PCT/US2017/032770.
International Search and Written Opinion dated Sep. 17, 2017 in connection with PCT/US2017/032769.
EPO Communication dated Jun. 8, 2018 in connection with European application No. 16801329.0.
EPO Communication dated Jun. 8, 2018 in connection with European application No. 16801894.3.
EPO Communication dated Jan. 3, 2019 in connection with European application No. 17731331.9.
First Office Action dated May 24, 2019 in connection with Chinese application No. 2016800764756.
International Search and Written Opinion dated Sep. 18, 2017 in connection with PCT/US2017/032769.
Guozhang, "Container Gantry Cranes", China Railway Publisher, 1983, pp. 102-107.
Chunsheng, "Configures and Maintenance of Electric Handling Machineries", 2003, pp. 346-350.
Examination Report issued in connection with Indian Application No. 201847001370 dated Aug. 26, 2020.
First Office Action dated Sep. 11, 2020 in connection with Chinese Patent Application No. 201680076475.6.
First Office Action dated Nov. 4, 2019 in connection with Chinese Patent Application No. 2017800297024.
EP App. No. 16801329.0 European Search Report dated Mar. 1, 2021.
EP App. No. 16801894.3 European Search Report dated Dec. 17, 2020.
BR App. No. 11 2017 016737-9 Office Action dated Jun. 8, 2021.
BR App. No. 11 2017 016740-9 Office Action dated Jun. 8, 2021.
CN App. No. 201680076486.4 Second Office Action dated Apr. 19, 2021.
U.S. Appl. No. 16/502,867 Office Action dated Jun. 18, 2021.
Zhang, "2013 Crane Design Manual (Second Edition) Chinese Edition)", 2013.
EPO Communication dated Dec. 17, 2020 in connection with European application No. 16801894.3.
Examination Report issued in connection with Indian Application No. 201847001449 dated Feb. 17, 2021.
EPO Communication dated Mar. 1, 2021 in connection with European application No. 16801329.0.
Second Office Action dated Apr. 19, 2021 in connection with Chinese Patent Application No. 201680076486.4.
Office Action dated Jun. 8, 2021 in connection with Brazilian Patent Application No. BR 11 2017 016737-9.
Office Action dated Jun. 8, 2021 in connection with Brazilian Patent Application No. BR 11 2017 016740-9.
Port Machinery Design Manuals, China Communications Press, Jan. 2001, pp. 1445-1450.
"Highspeed Train Generals and Trolleys", China Railway Publishing House, Aug. 2015, pp. 119-122.
EPO Communication dated Oct. 20, 2021, issued in connection with European application No. 16801894.3.

(56) References Cited

OTHER PUBLICATIONS

Third Office Action dated Nov. 10, 2021 issued in connection with Chinese Patent Application No. 201680076486.4.

\* cited by examiner

CARRIER CONFIGURED TO TRANSPORT VARIOUS SIZED OBJECTS

CROSS-REFERENCE TO RELATED APPLICATION(S)

This application is a continuation of U.S. patent application Ser. No. 15/335,423 filed on Oct. 26, 2016, entitled "Carrier Configured to Transport Various Sized Objects". This application is also related to and claims priority benefits from U.S. provisional patent application Ser. No. 62/246,535 filed on Oct. 26, 2015, entitled "Overhead Transportation and Route Management System". This application is related to and claims priority benefits from U.S. provisional patent application Ser. No. 62/249,086 filed on Oct. 30, 2015, entitled "Adjustable Container Carrier". This application is also related to and claims priority benefits from U.S. provisional patent application Ser. No. 62/337,272 filed on May 16, 2016, entitled "Carrier Configured to Transport Various Sized Objects". The '423, '272, '535, and '086 applications are each hereby incorporated by reference in their entireties.

FIELD OF THE INVENTION

The present disclosure relates to the transfer and movement of international shipping containers in port and transfer terminal facilities. In particular, the present disclosure relates to an overhead transport system and route management system for transporting shipping containers from one location in a port, terminal or warehouse facility to other location(s).

BACKGROUND OF THE INVENTION

Approximately 90% of non-bulk cargo worldwide is transported via intermodal containers arranged on ships. When these containers arrive at ports (either by land or by sea) they are moved onto or from ships, trains, and trucks.

Transferring containers from one mode of transportation to another is time and energy intensive. Loading/unloading ships is often conducted at the ground level with various mechanical machines such as cranes, trucks, forklifts, and straddle carriers. Often these machines burn fossil fuels and are inefficiently applied.

One particular problem with current methods for transferring intermodal shipping containers is that they require a large amount of ground space for maneuvering the containers into place. Containers can be up to 53 feet (16.15 meters) long, and can weigh in the range of 35-40 tons (31.8-6.3 metric tons). Ground space is a premium at and around busy ports. Another problem with current methods for transferring containers is that the large amount of time taken to unload ships often leads to port congestion and container backlog.

To alleviate many of these problems, the use of overhead rail transportation systems has been suggested. An overhead monorail solution provides advantages that would significantly improve container port operations, however it is not without its challenges. One challenge in particular involves quickly loading/unloading intermodal containers of various sizes onto the overhead rail transportation system.

What is needed is a carrier system designed for efficient material handling and transferring of intermodal containers from one form of transportation to another, and transporting containers from one area to another (for example, port area to inland terminals). The carrier works via an overhead rail transportation system to help eliminate, or at least reduce, backlogs at ports and clear up port congestion.

In some embodiments, the carrier would not directly utilize fossil fuel and as a result would reduce port pollution often caused by traditional methods.

SUMMARY OF THE INVENTION

A container carrier includes a load wheel configured to ride along the suspended railway; a trolley assembly; a body; a first plurality of end beams extending from the body configured to align a plurality of locking mechanisms with a first container of a first length; and a second plurality of end beams extending from the body configured to align a plurality of locking mechanisms with a second container of a second length, wherein the first length and the second length are different.

In some embodiments, the trolley assembly is motorized. The trolley assembly can include a motor; a connection-flange point configured to connect the motor to the wheel; a top guide wheel; a bottom guide wheel; an anti-tilt wheel; and/or a gearbox.

In some embodiments, the body can include a first bumper and a second bumper. In some embodiments, the bumpers can be made of a rubber and a shock absorbing assembly.

In some embodiments, the motor is electric and/or utilizes a regenerative power system.

In some embodiments, the locking mechanisms are four-corner locking pin mechanisms configured to support weight of, hold, and transport a container.

In some embodiments, the trolley assembly is connected to the body via a king pin.

In some embodiments, the wheel is made of carbon steel and/or coated with rubber or synthetic polymer.

In some embodiments, the locking mechanisms are twist locks.

In some embodiments, a container carrier can include a load wheel configured to ride along a suspended railway; a trolley assembly; and/or end beams configured to align a locking mechanism with a container such that the container is carried below the trolley assembly. In some embodiments, the trolley assembly is motorized. In some embodiments, the motor is electric. In some embodiments, the motor utilizes a regenerative power system.

In some embodiments, the trolley assembly comprises a motor; a connection-flange point configured to connect the motor to the wheel; and/or guide wheels. In some embodiments, the body of the container carrier comprises a first bumper; and a second bumper. In some embodiments, the bumpers are made of a shock absorbing assembly.

In some embodiments, the trolley assembly locking mechanism is a four-corner locking pin mechanism configured to lift, lower, hold, and transport the container. In some embodiments, the locking mechanisms are twist locks.

In some embodiments, the trolley assembly is connected to the body via a kingpin. In some embodiments, the load wheel is made of carbon steel. In other or the same embodiments, the load wheel is coated with rubber.

In some embodiments, the suspended railway is a monorail. In some embodiments, the monorail comprises a flanged track; an enclosed track and/or patented track.

In some embodiments, the end beams are fixed and configured to interact with various sized containers. In some embodiments, the trolley assembly is configured to move along the length of the body of the container carrier wherein the body comprises tubular longitude members that are supported by said end beams. In some embodiments, the tubular longitude members are round.

DETAILED DESCRIPTION OF PREFERRED EMBODIMENT(S)

The following is a detailed description of a fixed motorized container carrier (FMCC), a motorized adjustable container carrier (MACC), and a motorized trolley container carrier (MTCC).

Fixed Motorized Container Carrier (FMCC)

Figure 1:
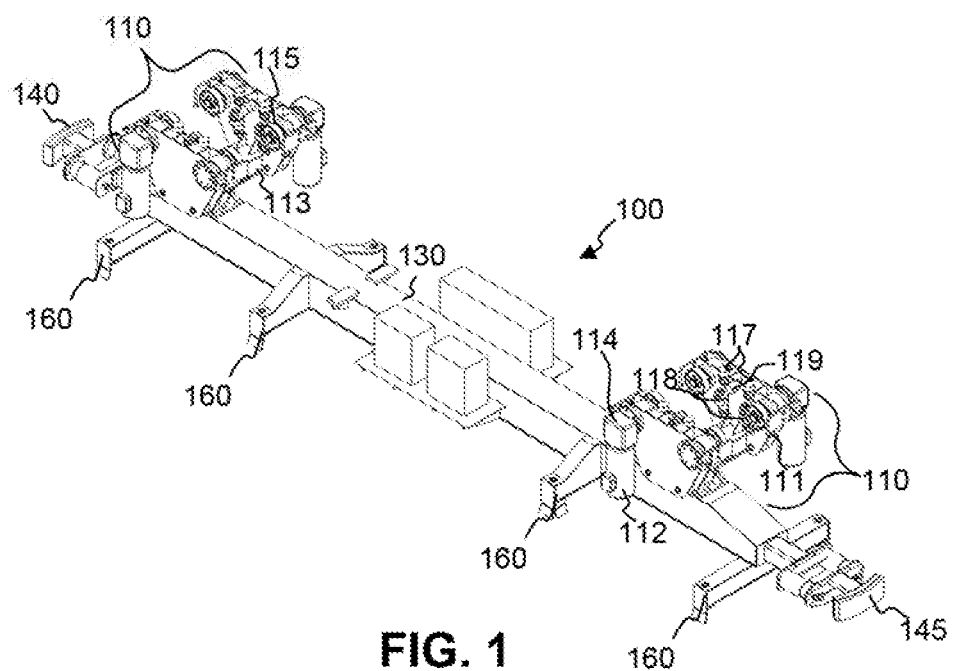
FIG. 1 is an isometric view of a fixed motorized container carrier.

FIG. 1 is an isometric view of fixed motorized container carrier 100. Fixed motorized container carrier (FMCC) 100 includes, among other things, motorized trolley assemblies 110, body 130, container engagement devices 160 mounted on end beams, first bumper 140 and second bumper 145. In some embodiments, container engagement devices 160 are twist locks.

Motorized trolley assemblies can include, among other things, wheel clean-sweep plate(s) 111, motor(s) 112, support frames with cross beam connector(s) 113, gearbox(es) 114, load wheel assemblies 120, king pin(s) 116, top guide wheel(s) 117, bottom guide wheel(s) 118 and anti-tilt guide wheel(s) 119.

Motorized trolley assemblies 110 can be self-propelled. Motorized trolley assemblies 110 are configured to move FMCC 100 along rail 205 on overhead track 210 (see FIG. 5). In some embodiments, track 210 is a monorail. In some embodiments, motorized trolley assemblies 110 can operate in multiple directions. In some embodiments (such as the one shown in FIG. 5) track 210 is flanged.

In some embodiments, track 210 is an "inverted-u" enclosed type track. In at least some of these embodiments, wheels 115 are at least partially enclosed in track 210. In some embodiments, track 210 is a patented type track. In other embodiments, track 210 is a single rail track in which body 130 is suspended from motorized trolley assemblies 110 with a "c-frame structure" (not shown) that wraps around track 210 and connects to at least one motorized trolley assembly 110 located on the upper side of track 210. Track 210 can be made up of, but is not limited to, steel beams and/or reinforced concrete beams.

In one embodiment, FMCC 100 has one motorized trolley assembly 110. In some embodiments, FMCC 100 can have a plurality of motorized trolley assemblies 110. In the embodiment shown in FIGS. 1-5, FMCC 100 has two motorized trolley assemblies 110 each with four load wheel assemblies 120. In some embodiments, each of motorized trolley assemblies 110 has one, two, three, four, five, six, seven, or eight load wheel assemblies 120. In yet another embodiment, FMCC 100 has three motorized trolley assemblies 110. In some embodiments, motorized trolley assemblies 110 of FMCC 100 are redundant in nature, meaning that if one or more motorized trolley assemblies 110 fail, FMCC 100 can still function.

Load wheel assemblies 120 can be configured to operate with attached gearbox(es) 114 and motor(s) 112 (driven wheels). In other or the same embodiments, load wheel assemblies 120 can be configured to operate without gearbox(es) 114 and motor(s) 112 (free wheels).

FIG. 1 shows FMCC 100 with two four-wheel trolley assemblies 110, each with two free wheels and two driven wheels. In other embodiments, trolley assemblies 110 can have two wheels. The driven wheel design is redundant in nature, meaning that if one or more of motors 112 or gearboxes 114 fail, FMCC 100 can still travel along track 210, as long as one gearbox-motor set remains functional.

In some embodiments, motorized trolley assemblies 110 are activated based on the power requirements of FMCC 100. For example, at times FMCC 100 can use less power, such as when it is not carrying a container, it is possible to activate only a single assembly. In instances when more power is useful, such as when FMCC 100 is carrying a heavy container, multiple assemblies 110 can be activated. This configuration saves both energy and wear on motorized trolley assemblies 110.

In some embodiments, motor(s) 112 and/or gearbox(es) 114 of motorized trolley assemblies 110 are synchronized, meaning they maintain appropriate synchronized speed (wheel rpm) for straights and turns. In some embodiments, this is done via variable frequency drive control systems.

The horsepower and/or motor count of motorized trolley assemblies 110 can be configured based on the specific demands of the environment in which FMCC 100 is to be deployed. In some embodiments, such as the ones shown in FIGS. 1-5, two motors 112 are used on each motorized trolley assembly 110.

Motorized trolley assemblies 110 can drive load wheel assemblies 120 and corresponding connection-flange points for various-sized motors 112. Motor(s) 112 can be selected to induce various accelerations and/or maintain velocities. In some embodiments, FMCC 100 can reach speeds exceeding 24 kilometers per hour and move containers weighing up to 71,600 lbs. (32,477 kg). In some embodiments, FMCC 100 can reach speeds exceeding 75 kilometers per hour and move containers weighing up to 136,000 lbs. (61,688 kg). Motor(s) 112 can be configured based on the specific demands of the environment in which FMCC 100 is to be deployed.

In some embodiments, motor(s) 112 is/are electric motors such as AC and/or DC electric motors. In other or the same embodiments, motor(s) 112 can be, among other things, heat engines (including combustion engines) and/or physically powered motors. In some embodiments, multiple types of motors 112 are present on a single FMCC 100.

When motors 112 are electric, FMCC 100 has the added benefit of reducing pollution caused by the burning of fossil fuels.

In some embodiments, motor(s) 112 can include internal braking mechanisms (not shown) and/or an energy recapture system that recover energy from braking. In other or the same embodiments, external brakes can be utilized. In some embodiments, the external brakes are discs and/or can brake multiple wheels at once.

In some embodiments, motor(s) 112 are mounted vertically to create a narrow profile. In certain embodiments, the power transfer from motor shaft to load wheel 115 is conducted through gearbox 114. In some embodiments, gearbox 114 is a helical bevel gearbox. In other embodiments, gearbox 114 can comprise, among other types, spur gear(s), spiral gear(s), or straight bevel gear(s). In certain embodiments, gearbox 114 can drive multiple wheel assemblies 115 at once. In other or the same embodiments, gearbox 114 can include a differential.

In some embodiments, gearbox 114 transfers the power through a 90-degree change in direction. In certain embodiments, gearbox 114 can have several gearing ratios to increase the efficiency of motorized trolley assemblies 110. In some embodiments, gearboxes 114 and/or motors 112 are configured to bolt-on to motorized trolley assemblies 110 for ease of replacement.

Various parts of the FMCC 100, including the side plates and cross beam connector 113 of motorized trolley assemblies 110 and body 130 can be constructed from various materials including steel plating. Exposed steel can be coated to slow or prevent corrosion and/or rusting. Various parts of the FMCC 100, including the side plates and cross beams 113 of motorized trolley assemblies 110 and body 130 can be constructed from various standard structural shapes.

Load wheel assemblies 120 can include a shaft and bearing design. In some embodiments, the shaft and bearings are made of high-grade premium alloys. In some embodiments, load wheels 115 can be attached to a high-grade premium alloy normalized steel shaft which is press fitted into a cylindrical roller bearing assembly. Load wheels 115 can be secured to the shaft via a carbon steel end cap fastened with tapered head machine screws.

In certain embodiments, the cylindrical roller bearing assembly includes high speed roller bearings at each end fitted into a bearing support tube. The support tube can have carbon steel walls with end covers that are fastened at both ends via machine screws.

The friction surface of load wheel 115 can be made of a variety of materials depending on the properties desired. For example, for high demand applications load wheel 115 can be made of, among other things, flame hardened forged carbon steel. In situations where noise reduction is desired, load wheels 115 can be a special steel alloy and/or have partial and/or complete coatings of natural and/or synthetic rubber(s)/polymer(s). In some embodiments, partial coatings can resemble tires. Load wheels can be coated with polyurethane. In some embodiments, load wheels 115 are pneumatic tires.

In some embodiments, FMCC 100 can utilize direct positive mechanical engagement or external assist for inclines and declines, via cables/ropes, gears, or chains drives when above 1% grade. In some embodiments, FMCC 100 can climb grades over 15%.

In some embodiments, load wheel 115 has an outside diameter of essentially 400 mm, although other sizes can be used as well.

In certain embodiments, load wheels 115 are configured to be easily removed from motorized trolley assembly 110 for maintenance and/or replacement. In some embodiments, this is accomplished via a bolt-on retaining flange.

In some embodiments, motorized trolley assemblies 110 have various guide wheels configured to keep load wheels 115 in an optimum, or at least improved, alignment with track 210. Guide wheels can be coated with, among other things, rubber and/or polyurethane. In some embodiments, guide wheels can be pneumatic tires. In the embodiment shown, top guide wheels 117 and bottom guide wheels 118 keep FMCC 100 aligned to track 210. Anti-tilt wheels 119 keep motorized trolley assembly 110, and therefore FMCC 100 as a whole, from tilting horizontally when load-shifting occurs.

In some embodiments, wheel clean-sweep plates 111 are mounted on either or both sides of some, if not all, load wheel assemblies 120 and provide for continuous removal of obstructions or debris that can accumulate on rail 205. In some embodiments, wheel clean-sweep plate 111 as a whole, or just the portion that moves over rail 205, can be made of a replaceable and serviceable high-density, synthetic material to remove obstructions. In some embodiments, wheel clean-sweep plate 111 is made of a steel plate. In some embodiments, wheel clean-sweep plate 111 can incorporate non-adhesive properties that allow for improved discharge of debris collected on a face of wheel clean-sweep plate 111.

In some embodiments, motor(s) 112, particularly electric motors 112, can receive power-feed from power supply buss(es) installed along the main track. In certain embodiments, these power buss(es) can have corresponding and aligned power pick-up shoes on each motorized trolley assembly 110 for power transfer into the motors and/or for feeding regenerated power back into the system during deceleration, braking and track decline sections.

Body 130 is connected to motorized trolley assemblies 110. In some embodiments, body 130 is connected to motorized trolley assemblies 110 via king pin(s) 116 (see FIG. 2) and bracket 113. This configuration allows for easy replacement of motorized trolley assemblies 110.

Kingpin(s) 116 can include a ball swivel top flange, designed with a thrust bearing, configured for descending through from the top, and out the bottom, of bracket 113. Kingpins 116 can rotate within the allotted passageway and can have the ability to absorb vertical and lateral forces. In some embodiments, the lower end of kingpins 116 can have full-circle, eyelet-designed bracket through which a secondary pin is placed, thus joining it with the top of body 130. This configuration allows the system to be readily hooked and unhooked for service and maintenance.

In other embodiments, body 130 is directly connected to motorized trolley assemblies 110. This direct connection can be accomplished by, among other things, a steel universal joint, a steel eyelet-to-eyelet, or a steel hook-to-eyelet connection.

In some embodiments, first bumper 140 and second bumper 145 are attached to body 130. In some embodiments, first bumper 140 and second bumper 145 are symmetrically designed since FMCC 100 can operate bi-directionally. Bumper assemblies can be made of, among other things, spiral spring-loaded tubes with rubber externals or a similar shock absorbing material such as, but not limited, to leaf-springs or gas shock absorbers. In certain embodiments, first bumper 140 and second bumper 145 are configured so that containers being carried by separate FMCCs 100 cannot, or are at least less likely to, hit each other. First bumper 140 and second bumper 145 also help reduce, if not eliminate, damage caused by collisions between multiple FMCCs 100 and/or external objects.

The spacing created by first bumper 140 and second bumper 145, can also aid in maintaining safety-rated weight distribution on over-head track 210 and support structure when FMCC 100 are in an accumulated state.

In certain embodiments, bumpers 140/145 are attached to body 130 by a telescoping mechanism so their length from the center of body 130 can be adjusted depending on the length of container 220.

Body 130 can have various extruding end beams 150 with container engagement devices 160 configured to interact with container 220. In some, if not most embodiments, end beams 150 are fixed relative to each other and are not readily moved.

In some embodiments, FMCC 100 has multiple end beams 150 that are positioned in such a way that container engagement devices 160 on FMCC 100 can interact with various sized containers 220 without having to have end beams 150 repositioned. For example, in the embodiment shown in FIG. 2, the four exterior end beams 150 are configured to interact with container 220 of a first length (for example 40 feet). The same FMCC of FIG. 2 could also interact with a second container (not shown) with a second length (for example 20 feet), via the four interior end beams 150. In some embodiments, a container of a third length (for example 30 feet) can interact with two interior beams 150 and two exterior beams 150.

This use of multiple fixed end beams 150 and their corresponding container engagement devices 160 allows a single FMCC 100 to be used with containers 220 of various lengths, without having to adjust its features, either manually or electronically. Often the length of container 220 is one of a few standard sizes.

These versatile FMCCs 100 lead to less down time in which the spacing of container engagement devices 160 would have to be reconfigured, and/or fewer movable parts which are more likely to break than fixed beams.

Figure 2:
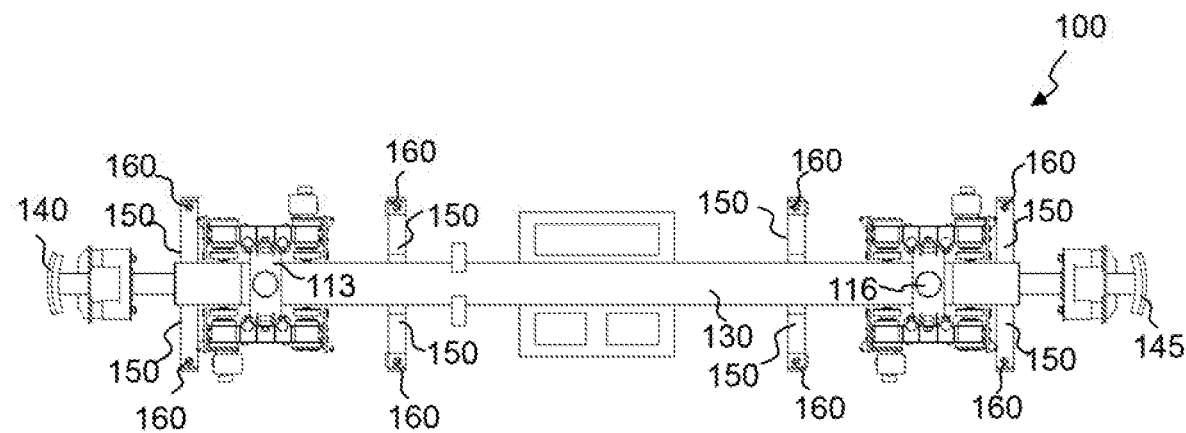
FIG. 2 is a top elevation view of a fixed motorized container carrier.
Figure 3:
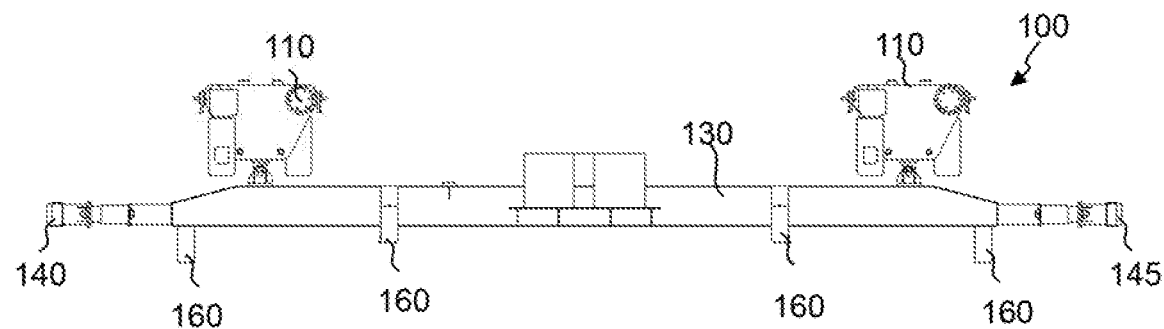
FIG. 3 is a side elevation view of a fixed motorized container carrier.
Figure 4:
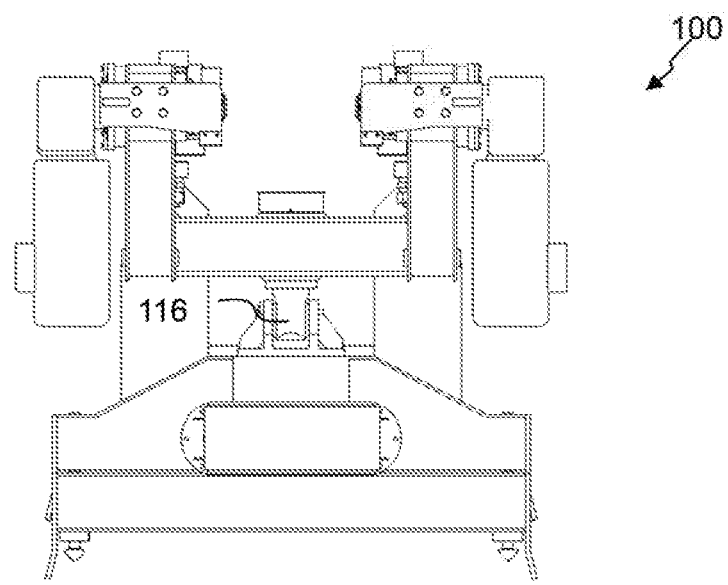
FIG. 4 is a front elevation view of a fixed motorized container carrier.

Although FIG. 2 only shows four end beams 150, FMCCs 100 can have various numbers of end beams and as a result, a single FMCC 100 can be configured to work with a large number of containers. In some embodiments, such as the embodiment shown, end beams 150 have container engagement devices 160 located on each end. In other embodiments, end beams 150 terminate at body 130 and have only one container engagement device 160 per each end beam 150.

In some embodiments, container engagement devices 160 are twist locks that connect directly to shipping containers 220 using the industry standardized four-corner pin locking system. In some embodiments, container engagement devices 160 are rotated electronically with dedicated electric motors. In some embodiments, a pair of container engagement devices 160 are turned with a linkage assembly powered by a single motor. In some embodiments, container engagement device 160 rotation can be driven by electric-driven linear actuators.

In certain embodiments, various armatures are attached to body 130, such that the same FMCC 100 can be used with containers of various sizes. In some embodiments, the armatures are configured to coordinate with shipping containers 220 of various lengths including, but not limited to 20 feet (6.1 meters), 30 feet (9.1 meters), 40 feet (12.2 meters), 45 feet (13.7 meters), 48 feet (14.6 meters) and/or 53 feet (16.15 meters).

In some embodiments, a single FMCC 100 is configured to work with multiple sized shipping containers 220.

In some embodiments, FMCC 100 is configured to work under various external forces including, but not limited to, temperatures ranging from −30 degrees Celsius to 60 degrees Celsius, wind gusts up to 200 kilometers per hour, rain, sleet, hail, and/or snow.

Figure 5:
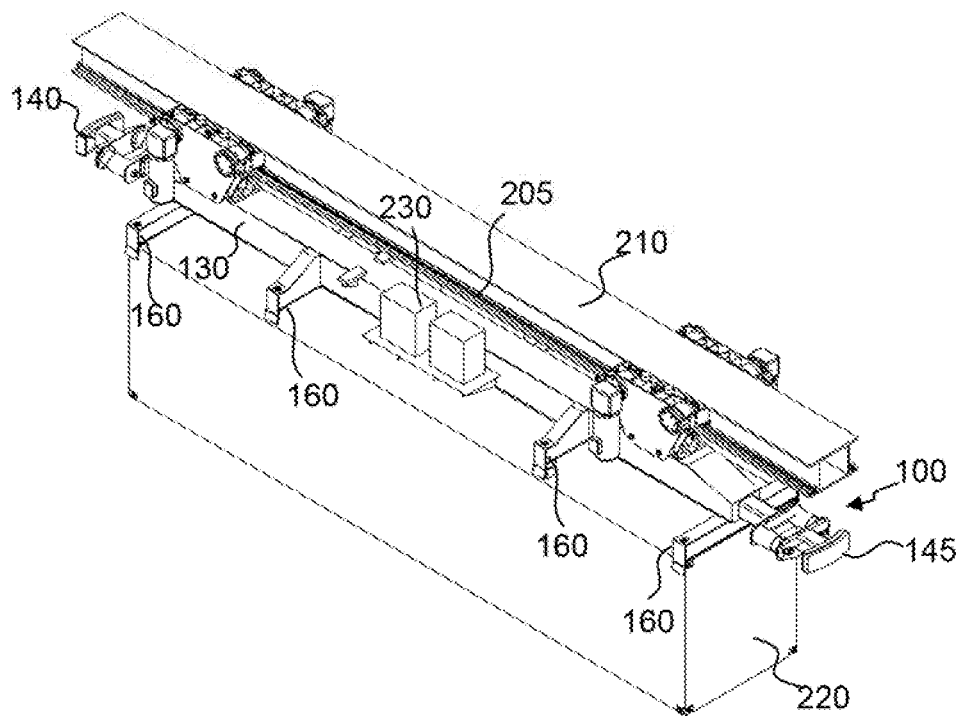
FIG. 5 is an isometric view of a fixed motorized container carrier on a track carrying a container.
Figure 6:
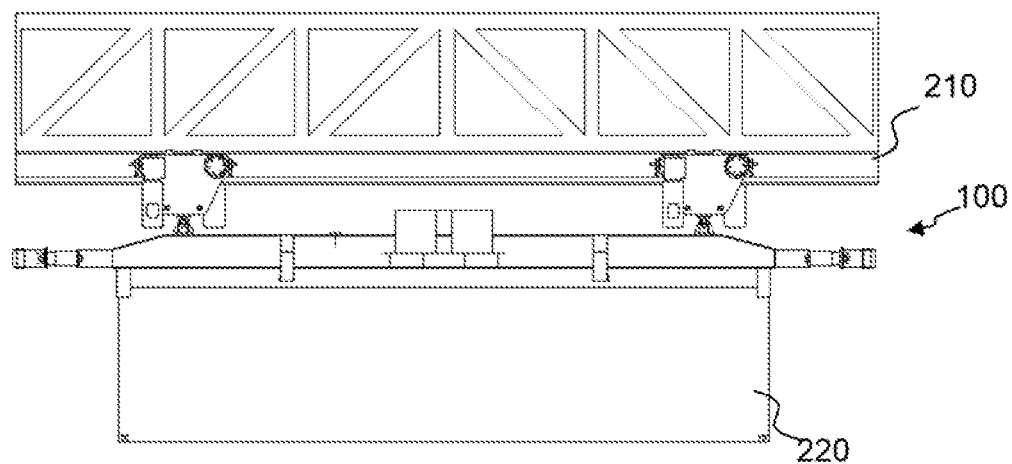
FIG. 6 is a side elevation view of a fixed motorized container carrier on a track carrying a container.
Figure 7:
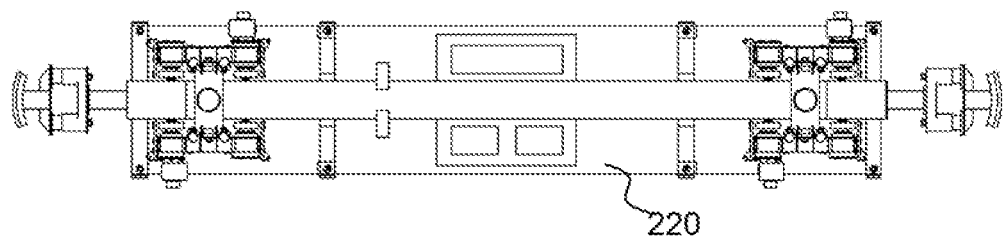
FIG. 7 is a top elevation view of a fixed motorized container carrier on a track carrying a container.
Figure 8:
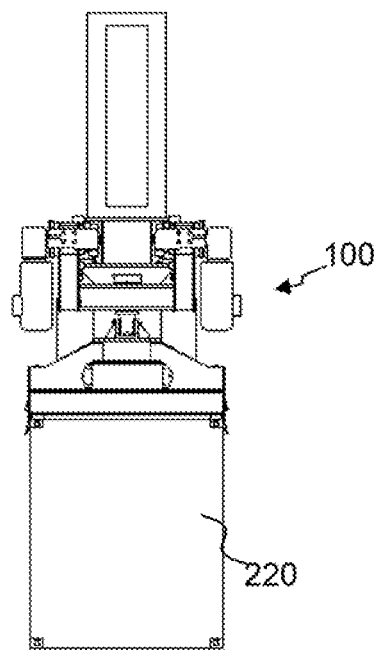
FIG. 8 is a front elevation view of a fixed motorized container carrier on a track carrying a container.
Figure 9:
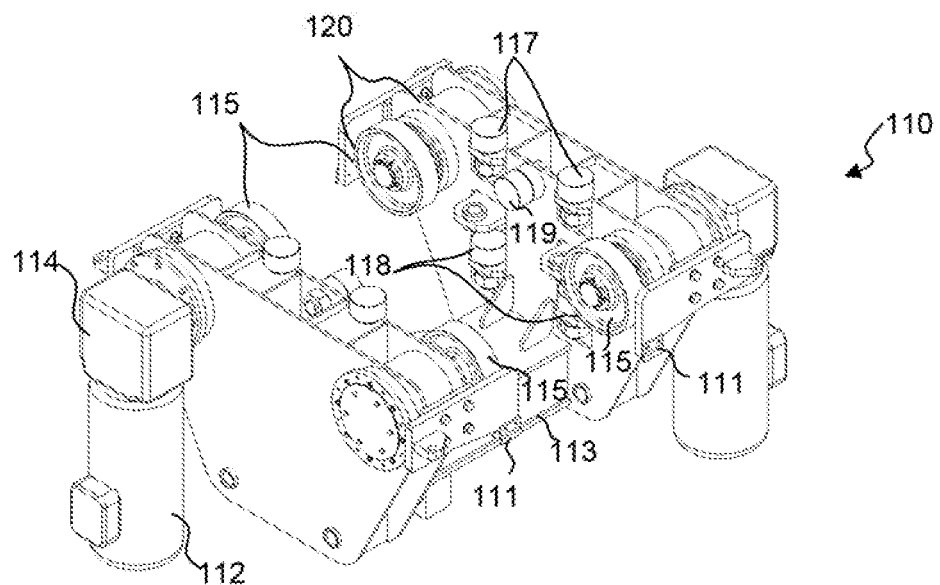
FIG. 9 is an isometric view of a motorized trolley assembly.
Figure 10:
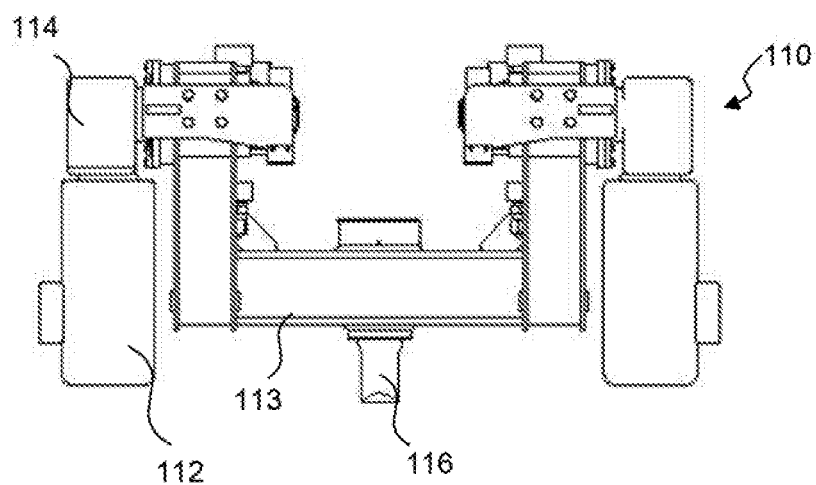
FIG. 10 is a front elevation view of a motorized trolley assembly.
Figure 11:
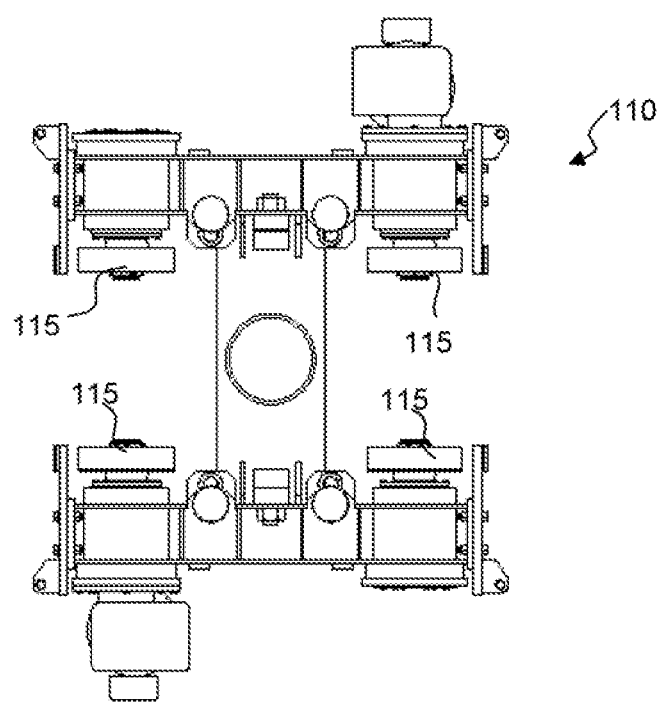
FIG. 11 is a top elevation view of a motorized trolley assembly.
Figure 12:
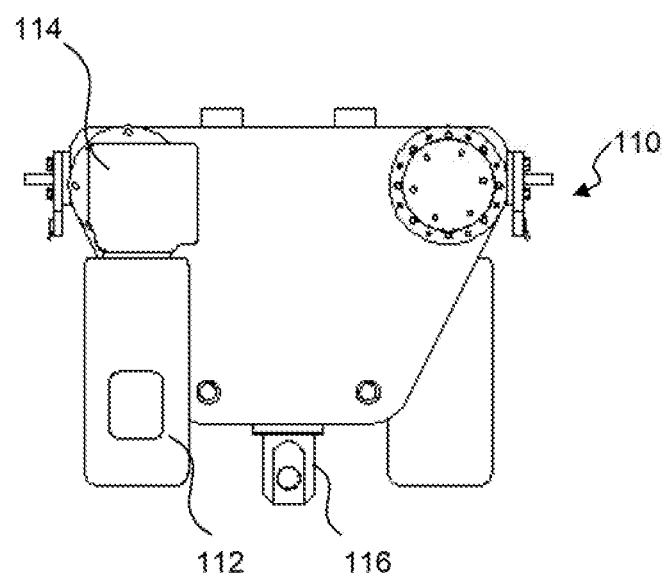
FIG. 12 is a side elevation view of a motorized trolley assembly.

FIG. 5 is an isometric view of fixed motorized container carrier 100 on track 210 with shipping container 220. Fixed motorized container carrier 100 also includes electronic controls 230. Electronic controls 230 can be powered through a shoe and buss system, such as the one discussed earlier. In some embodiments, electronic controls 230 include controls and power units. In some embodiments, the controls monitor and manage information from the sensor(s) located on the FMCC 100.

In some embodiments, shipping container 220 is a shipping container. In some embodiments, the length of shipping container 220 is a standard size such as, but not limited to, 20 feet (6.1 meters), 30 feet (9.1 meters), 40 feet (12.2 meters), 45 feet (13.7 meters), 48 feet (14.6 meters) or 53 feet (16.15 meters).

In some embodiments, track 210 is a monorail, separate from the support structure (steel or otherwise). In other or the same embodiments, track 210 is integrated with the structure (steel or otherwise).

Although this device has been descried as being used with intermodal shipping containers, it can also be employed in other settings such as transporting passenger cars from ferries.

Motorized Adjustable Container Carrier (MACC)

Figure 13:
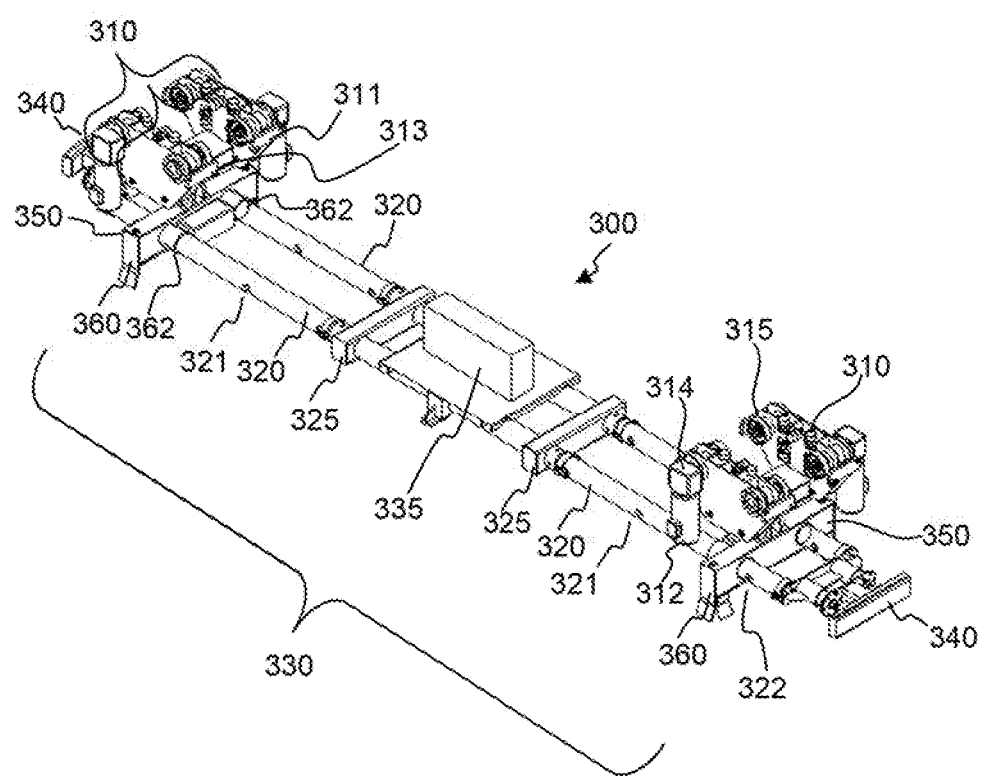
FIG. 13 is an isometric view of a motorized adjustable container carrier.
Figure 14:
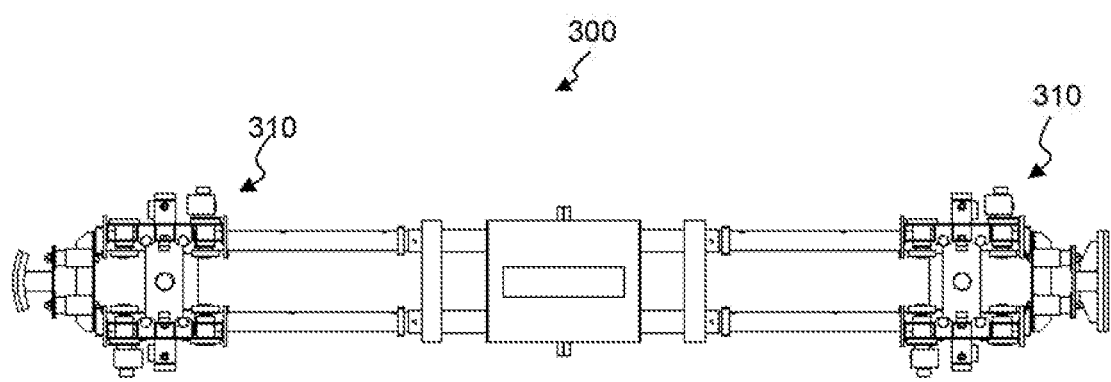
FIG. 14 is a top elevation view of a motorized adjustable container carrier in a first position.
Figure 15:
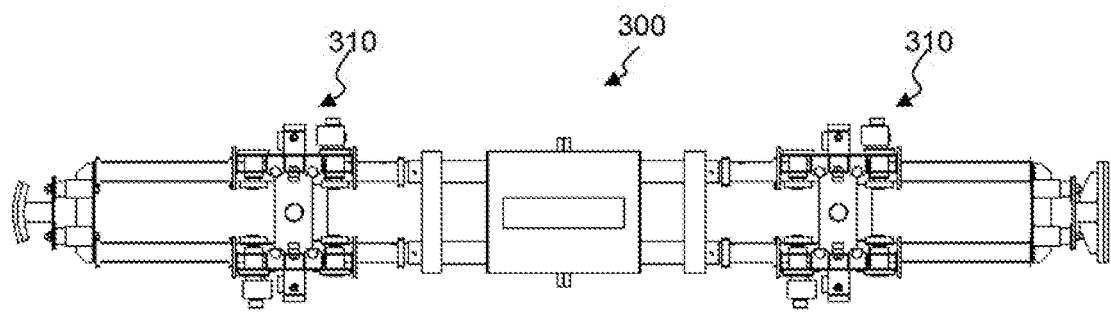
FIG. 15 is a top elevation view of a motorized adjustable container carrier in a second position.
Figure 16:
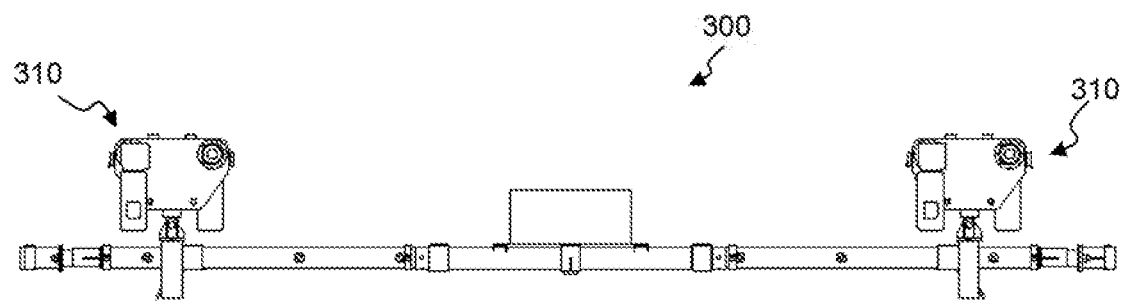
FIG. 16 is a side elevation view of a motorized adjustable container carrier in a first position.
Figure 17:
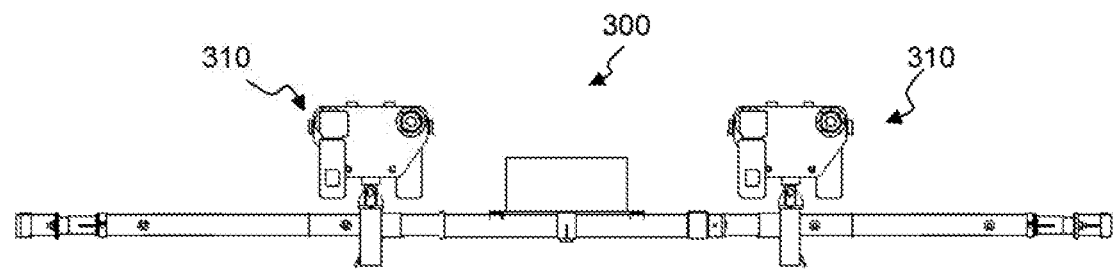
FIG. 17 is a side elevation view of a motorized adjustable container carrier in a second position.
Figure 18:
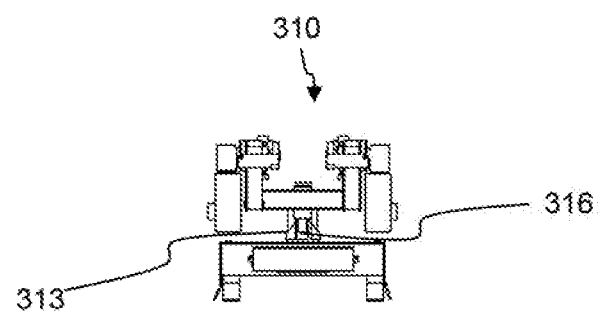
FIG. 18 is a front elevation view of a motorized adjustable container carrier.
Figure 19:
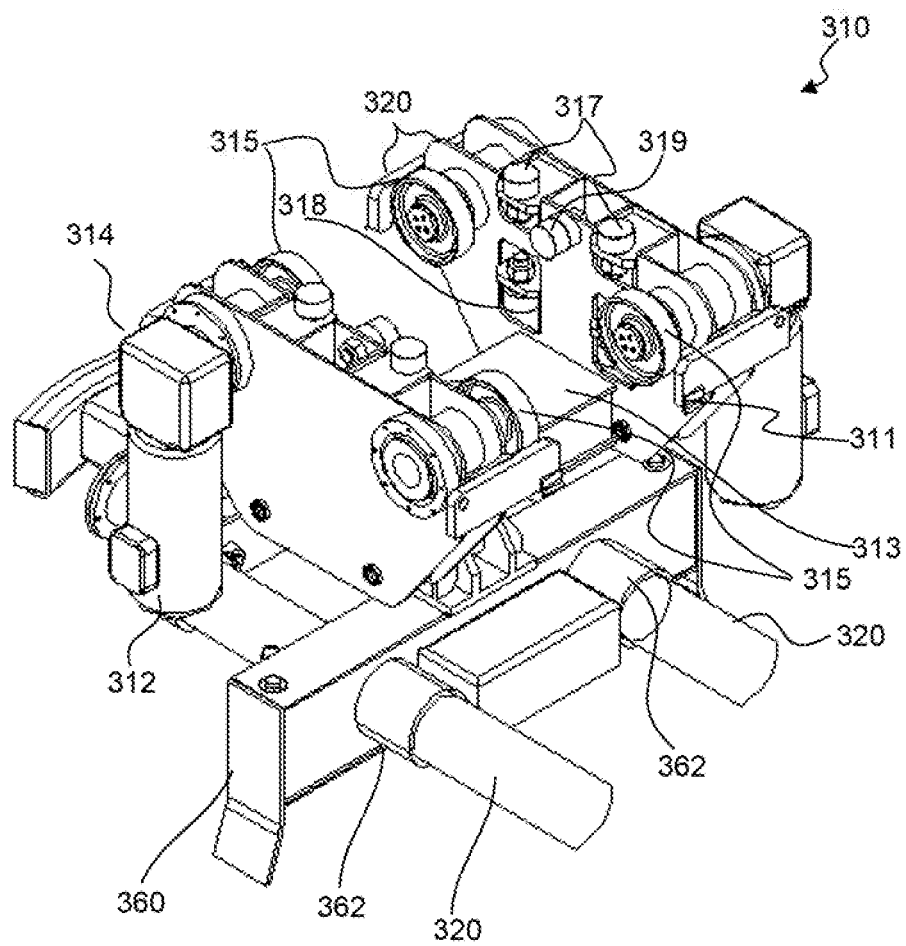
FIG. 19 is an isometric view of a trolley of a motorized adjustable container carrier.

Motorized Adjustable Container Carrier (MACC) 300 is shown in FIG. 13. MACC 300 is designed to provide automatic, hands free adjustment of its own effective frame size to suit the pickup of variously sized shipping containers.

FIG. 13 is an isometric view of MACC 300. Motorized adjustable container carrier (MACC) 300 can include, among other things, motorized trolley assemblies 310, body 330, container engagement devices 360 (which are twist locks in some embodiments) mounted on end beams 350, and bumpers 340. In some embodiments, MACC 300 is not motorized.

Motorized trolley assemblies 310 can include, among other things, wheel clean-sweep plate(s) 311, motor(s) 312, gearboxes 314, load wheel assemblies 320, king pin(s) 316, top guide wheel(s) 317, bottom guide wheel(s) 318 and anti-tilt guide wheel(s) 319.

Motorized trolley assemblies 310 can be self-propelled. Motorized trolley assemblies 310 are configured to move MACC 300 along rail on overhead track 210 (see FIG. 20). In some embodiments, track 210 is a monorail. In some embodiments, motorized trolley assemblies 310 can operate in both directions. In some embodiments, track 210 is flanged.

In some embodiments, track 210 is an "inverted-u" enclosed type track. In at least some of these embodiments, wheels 315 are at least partially enclosed in track 210. In some embodiments, track 210 is a patented type track.

In other embodiments, track 210 is a single rail track in which body 330 is suspended from motorized trolley assemblies 310 with a "c-frame structure" (not shown) that wraps around track 210 and connects to at least one motorized trolley assembly 310 located on the upper side of track 210. Track 210 can be made up of, but is not limited to, steel beams and/or reinforced concrete beams.

In one embodiment, MACC 300 has one motorized trolley assembly 310. In some embodiments, MACC 300 can have a plurality of motorized trolley assemblies 310. In the embodiments shown in FIGS. 13-20, MACC 300 has two motorized trolley assemblies 310 each with four load wheel assemblies 320. In some embodiments, each motorized trolley assembly 310 has two load wheel assemblies 320. In yet another embodiment, MACC 300 has three motorized trolley assemblies 310. In some embodiments, motorized trolley assemblies 310 of MACC 300 are redundant in nature, meaning that if one or more motorized trolley assemblies 310 fail, MACC 300 can still function.

Load wheel assemblies 320 can be configured to operate with attached gearbox(es) 314 and motor(s) 312 (driven wheels). In other or the same embodiments, load wheel assemblies 320 can be configured to operate without gearbox(es) 314 and motor(s) 312 (free wheels).

FIG. 13 shows MACC 300 with two four-wheel trolley assemblies 310, each with two free wheels and two driven wheels. In other embodiments, trolley assemblies 310 can have two wheels. In some embodiments, the driven wheel design is redundant in nature, meaning that if one or more of motors 312 or gearboxes 314 fail, MACC 300 can still travel along track 210, as long as one gearbox-motor set remains functional.

In some embodiments, motorized trolley assemblies 310 are activated based on the power requirements of MACC 300. For example, when little power is needed, such as when MACC 300 is not carrying a container, only one assembly 310 may be activated. In instances when more power is required, such as when MACC 300 is carrying a heavy container, multiple assemblies 310 can be activated. This configuration saves both energy and wear on motorized trolley assemblies 310.

In some embodiments, motor(s) 312 and/or gearbox(es) 314 of motorized trolley assemblies 310 are synchronized, meaning they maintain appropriate synchronized speed (wheel rpm) for straights and turns. In some embodiments, this is done via variable frequency drive control systems.

The horsepower and/or motor count of motorized trolley assemblies 310 can be configured based on the specific needs of the environment MACC 300 is to be deployed. In some embodiments, such as the ones shown in FIGS. 13-20, two motors 312 are used on each motorized trolley assembly 310.

Motorized trolley assemblies 310 can drive load wheel assemblies 320 and corresponding connection-flange points for various-sized motors 312. Motor(s) 312 can be selected to induce various accelerations and/or maintain velocities. In some embodiments, MACC 300 can reach speeds exceeding 32 kilometers per hour and move containers weighing up to 71,600 lbs. (32,477 kg). In some embodiments, MACC 300 can reach speeds exceeding 75 kilometers per hour and move containers weighing up to 136,000 lbs. (61,688 kg). Motor(s) 312 can be configured based on the specific needs of the environment MACC 300 is to be deployed.

In some embodiments, motor(s) 312 is/are electric motors such as AC and/or DC electric motors. In other or the same embodiments, motor(s) 312 can be, among other things, heat engines (including combustion engines) and/or physically powered motors. In some embodiments, multiple types of motors 312 are present on a single MACC 300.

When motors 312 are electric, MACC 300 has the added benefit of reducing pollution caused by the burning of fossil fuels.

In some embodiments, motor(s) 312 can include internal braking mechanisms (not shown) and/or an energy recapture system that recover energy from braking. In other or the same embodiments, external brakes can be utilized. In some embodiments, the external brakes are discs and/or can brake multiple wheels at once.

In some embodiments, motor(s) 312 are mounted vertically to create a narrow profile. In certain embodiments, the power transfer from motor shaft to wheel 315 is conducted through gearbox 314. In some embodiments, gearbox 314 is a helical bevel gearbox. In other embodiments, gearbox 314 can include, among other types, spur gear(s), spiral gear(s), or straight bevel gear(s). In certain embodiments, gearbox 314 can drive multiple wheels 315 at once. In other or the same embodiments, gearbox 314 can include a differential.

In some embodiments, gearbox 314 transfers the power through a 90-degree change in direction. In certain embodiments, gearbox 314 can have several gearing ratios to increase the efficiency of motorized trolley assemblies 310. In some embodiments, gearboxes 314 and/or motors 312 are configured to bolt-on to motorized trolley assemblies 310 for ease of replacement.

Various parts of MACC 300, including the side plates and cross beam connector 313 of motorized trolley assemblies 310 and body 330 can be constructed from various materials including steel plating. Exposed steel can be coated for anti-corrosion and anti-rusting. Various parts of MACC 300, including the side plates and cross beam connector 313 of motorized trolley assemblies 310 and body 330 can be constructed from various standard structural shapes.

Load wheel assemblies 320 can include a shaft and bearing design. In some embodiments, the shaft and bearings are made of high-grade premium alloys. In some embodiments, load wheels 315 can be attached to a high-grade premium alloy normalized steel shaft which is press fitted into a cylindrical roller bearing assembly. Load wheels 315 can be secured to the shaft via a carbon steel end cap fastened with tapered head machine screws.

In certain embodiments, the cylindrical roller bearing assembly includes high speed roller bearings at each end fitted into a bearing support tube. The support tube can have carbon steel walls with end covers that are fastened at both ends via machine screws.

The friction surface of load wheel 315 can be made of a variety of materials depending on the properties desired. For example, for high demand applications the load wheel 315 can be made of, among other things, flame hardened forged carbon steel. In situations where noise should be minimized, or at least reduced, load wheels 315 can be a special steel alloy and/or have partial and/or complete coatings of natural and/or synthetic rubber(s)/polymer(s). In some embodiments, partial coatings can resemble tires. Load wheels can be coated with polyurethane. In some embodiments, load wheels 315 are pneumatic tires.

In some embodiments, MACC 300 can utilize direct positive mechanical engagement or external assist for inclines and declines, via cables/ropes, gears, or chains drives when above 1% grade. In some embodiments, MACC 300 can climb grades over 15%.

In some embodiments, load wheel 315 has an outside diameter of essentially 400 mm, although other sizes can be used as well.

In certain embodiments, load wheels 315 are configured to be easily removed from motorized trolley assembly 310 for maintenance and/or replacement. In some embodiments, this is accomplished via a bolt-on retaining flange.

In some embodiments, motorized trolley assemblies 310 has various guide wheels configured to keep load wheels 315 in an optimum, or at least improved, alignment with track 210. Guide wheels can be coated with, among other things, rubber and/or polyurethane. In some embodiments, guide wheels can be pneumatic tires. In the embodiment shown, top guide wheels 317 and bottom guide wheels 318 keep MACC 300 aligned to track 210. Anti-tilt wheels 319 keep motorized trolley assembly 310, and therefore MACC 300 as a whole, from tilting horizontally when load-shifting occurs.

In some embodiments, wheel clean-sweep plates 311 are mounted on either or both sides of MACC 300 of some, if not all, load wheels assemblies 320 and provide for continuous removal of obstructions or debris that can accumulate on rail 205. In some embodiments, wheel clean-sweep plate 311 as a whole, or just the portion that moves over rail 205, can be made of a replaceable and serviceable high-density, synthetic material to remove obstructions. In some embodiments, wheel clean-sweep plate 311 is made of a steel plate. In some embodiments, wheel clean-sweep plate 311 can incorporate non-adhesive properties that allow for improved discharge of debris collecting on the face of wheel clean-sweep plate 311.

In some embodiments, motor(s) 312, particularly electric motors 312, can receive power-feed from power supply buss(es) installed along the main track. In certain embodiments, these power buss(es) can have corresponding and aligned power pick-up shoes on each motorized trolley assembly 310 for power transfer into the motors and/or for feeding regenerated power back into the system during deceleration, braking and track decline sections.

Body 330 is connected to motorized trolley assemblies 310. In some embodiments, body 330 is connected to motorized trolley assemblies 310 via kingpin(s) 316 (see FIG. 18) and cross beam connector 313. This configuration allows for easy replacement of motorized trolley assemblies 310.

Kingpin(s) 316 can include a ball swivel top flange, designed with a thrust bearing, configured for descending through from the top, and out the bottom, of cross beam connector 313. Kingpins 316 can rotate within the allotted passageway and can have the ability to absorb vertical and lateral forces. In some embodiments, the lower end of kingpins 316 can have a full-circle, eyelet-designed bracket through which a secondary pin is placed, thus joining it with the top of body 330. This configuration allows the system to be readily hooked and unhooked for service and maintenance.

In other embodiments, body 330 is directly connected to motorized trolley assemblies 310. This direct connection can be accomplished by, among other things, a steel universal joint, a steel eyelet-to-eyelet, or a steel hook-to-eyelet connection.

In some embodiments, bumpers 340 are attached to body 330. In some embodiments, bumpers 340 are symmetrically designed since MACC 300 can operate bi-directionally. Bumper assemblies can be made of, among other things, spiral spring-loaded tubes with rubber externals or a similar shock absorbing material such as, but not limited, to leaf-springs or gas shock absorbers. In certain embodiments, bumpers 340 are configured so that containers being carried by separate MACC 300 cannot, or are at least less likely, to hit each other. Bumpers 340 also help reduce, if not eliminate, damage caused by collisions between multiple MACCs 300 and/or external objects.

The spacing created by bumpers 340, can also aid in maintaining safety-rated weight distribution on over-head track 210 and support structure when MACCs 300 are in an accumulated state.

In certain embodiments, bumpers 340 are attached to body 330 by a telescoping mechanism so their length from the center of body 330 can be adjusted depending on the length of container 220.

In some embodiments, trolleys 310 will move along the length of the body 330 to adjust for the different sizes of containers. Body 330 consists of tubular longitude members 320 that are supported by the end beams 350. The end beams 350 holes and brackets 362 that allow it of slide along the tubular longitude members. There is a locking pin that secures the end beam into hole 321 for a first position for example 20 ft) position and hole 322 for a second position (for example, 40 ft).

In some embodiments, the sequence of operation for configuring MACC 300 to move a 20 ft container to a 40 ft container is as follows. A first trolley 310 can remove the self-seating locking pin from hole 321 and then move out from the center and sliding on the tubular longitude member 320 while a second trolley 310 is stopped. When the first trolley 310 reaches the appropriate position, the self-seating locking pin can be inserted in hole 322. Next, the second trolley removes its self-seating locking pin from hole 321 and moves out from the center the track and sliding on tubular longitude member 320 while the first trolley is stopped. When the second trolley 310 reaches the position the self-seating locking pin will be insert in hole 322.

In some embodiments, tubular longitude members 320 are round tubes. In other embodiments, tubular longitude members 320 are rectangular tubes.

In some embodiments, holes can be placed in various positions along tubular longitude members 320 to coordinate with shipping containers 220 of various lengths including, but not limited to 20 feet (6.1 meters), 30 feet (9.1 meters), 40 feet (12.2 meters), 45 feet (13.7 meters), 48 feet (14.6 meters) and/or 53 feet (16.15 meters).

In some embodiments, container engagement devices 360 are twist locks that connect directly to shipping containers 220 using the industry standardized four-corner pin locking system. In some embodiments, container engagement devices 360 are rotated electronically with dedicated electric motors. In some embodiments, a pair of container engagement devices 360 are turned with a linkage assembly powered by a single motor. In some embodiments, container engagement device 360 rotation can be driven by electric-driven linear actuators.

In some embodiments, a single MACC 300 is configured to work with multiple sized shipping containers 220.

In some embodiments, MACC 300 is configured to work under various external forces including, but not limited to, temperatures ranging from −30 degrees Celsius to 60 degrees Celsius, wind gusts up to 200 kilometers per hour, rain, sleet, hail, and/or snow.

Figure 20:
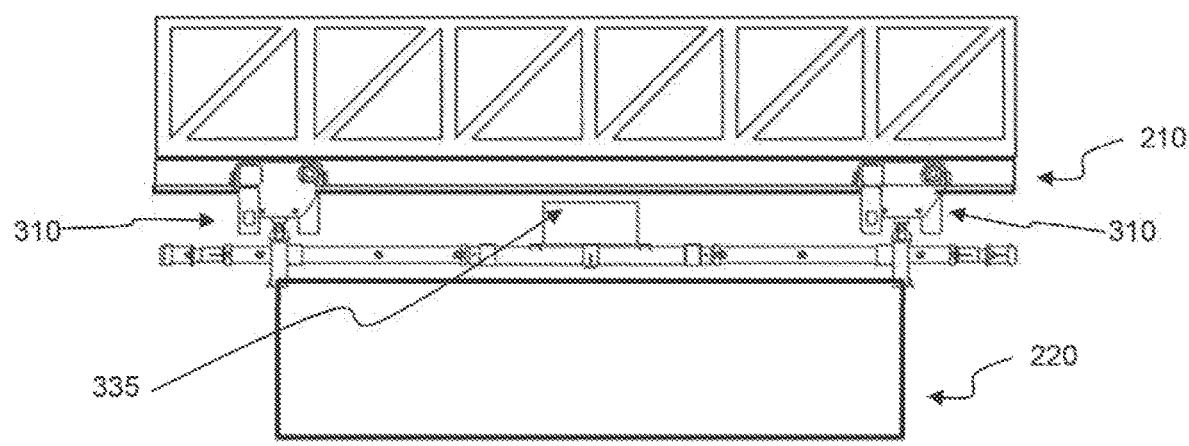
FIG. 20 is a side elevation view of motorized adjustable container carrier on a track with a container attached.

FIG. 20 is an isometric view of motorized adjustable container carrier 300 on track 210 with shipping container 220. Motorized adjustable container carrier 300 also includes electronic controls 335. Electronic controls 335 can be powered through a shoe and buss system. In some embodiments, electronic controls 335 includes controls and power units. In some embodiments, the controls monitor and manage information from the sensor(s) located on MACC 300.

In some embodiments, the length of shipping container 220 is a standard size such as, but not limited to, 20 feet (6.1 meters), 30 feet (9.1 meters), 40 feet (12.2 meters), 45 feet (13.7 meters), 48 feet (14.6 meters) or 53 feet (16.15 meters).

In some embodiments, track 210 is a monorail, separate from the support structure (steel or otherwise). In other or the same embodiments, track 210 is integrated with the structure (steel or otherwise).

Although this device has been descried as being used with intermodal shipping containers, it can also be employed in other settings such as transporting passenger cars from ferries.

Motorized Trolley Container Carrier (MTCC)

Motorized Trolley Container Carriers (MTCC) 500 is a container moving device, designed to provide automatic, hands free adjustment of its own positions to suit the pick-up of variously sized shipping containers. Motorized Trolley Container Carrier (MTCC) 500 can included, among other things, motorized trolley assemblies 510 and container engagement devices 560 (which are twist locks in some embodiments) mounted on end beams 550.

Motorized trolley assemblies can include, among other things, wheel clean-sweep plate(s) 511, motor(s) 512, gearboxes 514, load wheel assemblies 520, king pin(s) 516, top guide wheel(s) 517, bottom guide wheel(s) 518 and anti-tilt guide wheel(s) 519.

Motorized trolley assemblies 510 can be self-propelled. Motorized trolley assemblies 510 are configured to move MTCC 500 along rail on overhead track 210 (see FIG. 22 and FIG. 23). In some embodiments, track 210 is a monorail. In some embodiments, motorized trolley assemblies 510 can operate in both directions. In some embodiments, track 210 is flanged.

In some embodiments, track 210 is an "inverted-u" enclosed type track. In at least some of these embodiments, wheels 515 are at least partially enclosed in track 210.

In some embodiments, track 210 is a patented type track.

In other embodiments, track 210 is a single rail track in which body 530 is suspended from motorized trolley assemblies 510 with a "c-frame structure" (not shown) that wraps around track 210 and connects to at least one motorized trolley assembly 510 located on the upper side of track 210. Track 210 can be made up of, but is not limited to, steel beams and/or reinforced concrete beams.

In some embodiments, MTCC 500 can have a plurality of motorized trolley assemblies 510. In the embodiment shown in FIG. 22 and FIG. 23, MTCC 500 has two motorized trolley assemblies 510 each with four load wheel assemblies 520. In some embodiments, each motorized trolley assemblies 510 has two load wheel assemblies 520. In yet another embodiment, MTCC 500 has three motorized trolley assemblies 510. In some embodiments, motorized trolley assemblies 510 of MTCC 500 are redundant in nature, meaning that if one or more motorized trolley assemblies 510 fail, MTCC 500 can still function.

Load wheel assemblies 520 can be configured to operate with attached gearbox(es) 514 and motor(s) 512 (driven wheels). In other or the same embodiments, load wheel assemblies 520 can be configured to operate without gearbox(es) 514 and motor(s) 512 (free wheels).

Figure 22:
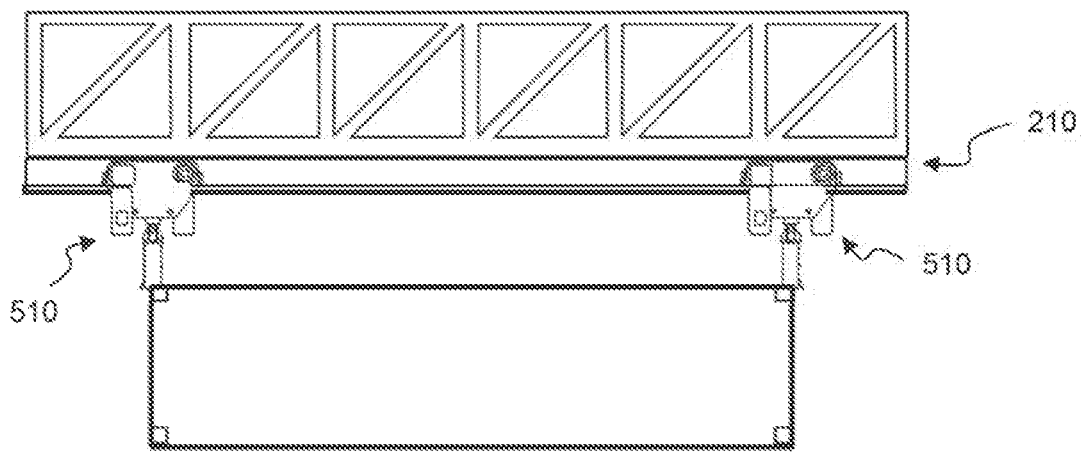
FIG. 22 is a side elevation view of a motorized trolley container carrier with a first sized container attached.
Figure 23:
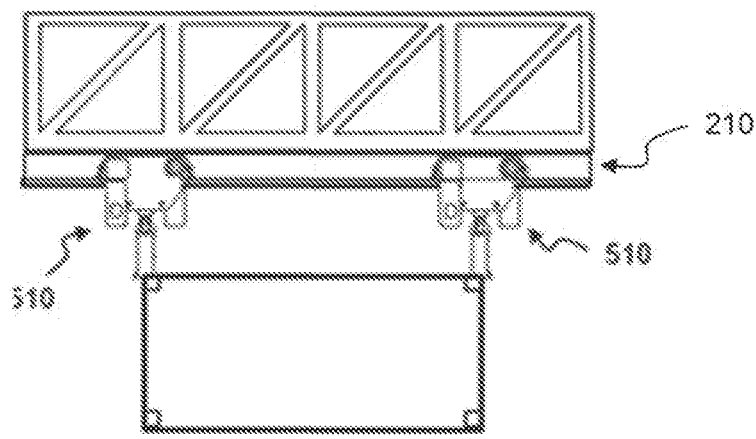
FIG. 23 is a side elevation view of a motorized trolley container carrier with second sized container attached.

FIGS. 22 and 23 show MTCC 500 with two four-wheel trolley assemblies 510, each with two free wheels and two driven wheels. In other embodiments, trolley assemblies 510 can have two wheels. The driven wheel design is redundant in nature, meaning that if one or more of motors 512 or gearboxes 514 fail, MTCC 500 can still travel along track 210, as long as one gearbox-motor set remains functional.

In some embodiments, motorized trolley assemblies 510 are activated based on the power requirements of MTCC 500. For example, when little power is needed, such as when MTCC 500 is not carrying a container, only one assembly 510 may be activated. In instances when more power is required, such as when MTCC 500 is carrying a heavy container, multiple assemblies 510 may be activated. This configuration saves both energy and wear on motorized trolley assemblies 510.

In some embodiments, motor(s) 512 and/or gearbox(es) 354 of motorized trolley assemblies 510 are synchronized, meaning they maintain appropriate synchronized speed (wheel rpm) for straights and turns. In some embodiments, this is done via variable frequency drive control systems.

Figure 21:
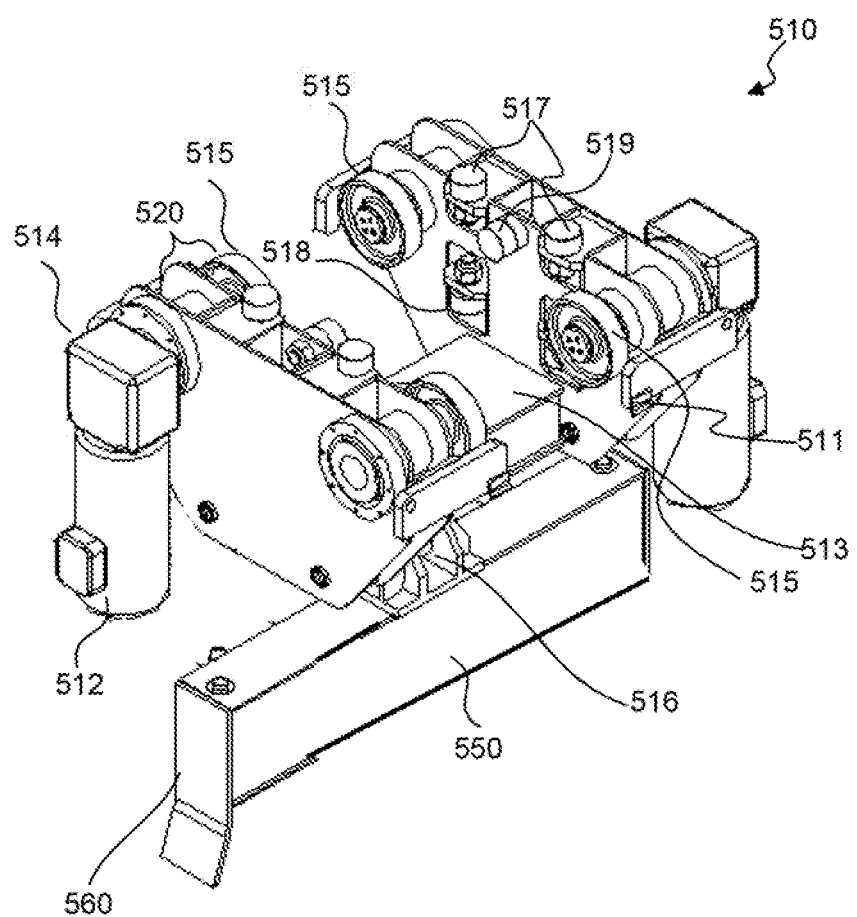
FIG. 21 is an isometric elevation view a motorized trolley container carrier.

The horsepower and/or motor count of motorized trolley assemblies 510 can be configured based on the specific needs of the environment MTCC 500 is to be deployed. In some embodiments, such as the ones shown in FIGS. 21-23, two motors 512 are used on each motorized trolley assembly 510.

Motorized trolley assemblies 510 can drive load wheel assemblies 520 and corresponding connection-flange points for various-sized motors 512. Motor(s) 512 can be selected to induce various accelerations and/or maintain velocities. In some embodiments, MTCC 500 can reach speeds exceeding 32 kilometers per hour and move containers weighing up to 71,600 lbs. (32,477 kg). In some embodiments, MTCC 500 can reach speeds exceeding 75 kilometers per hour and move containers weighing up to 136,000 lbs. (61,688 kg). Motor(s) 512 can be configured based on the specific needs of the environment MTCC 500 is to be deployed.

In some embodiments, motor(s) 512 is/are electric motors such as AC and/or DC electric motors. In other or the same embodiments, motor(s) 512 can be, among other things, heat engines (including combustion engines) and/or physically powered motors. In some embodiments, multiple types of motors 512 are present on a single MTCC 500.

When motors 512 are electric, MTCC 500 has the added benefit of reducing pollution caused by the burning of fossil fuels.

In some embodiments, motor(s) 512 can include internal braking mechanisms (not shown) and/or an energy recapture system that recover energy from braking. In other or the same embodiments, external brakes can be utilized. In some embodiments, the external brakes are discs and/or can brake multiple wheels at once.

In some embodiments, motor(s) 512 are mounted vertically to create a narrow profile. In certain embodiments, the power transfer from motor shaft to wheel 515 is conducted through gearbox 514. In some embodiments, gearbox 514 is a helical bevel gearbox. In other embodiments, gearbox 514 can comprise, among other types, spur gear(s), spiral gear(s), or straight bevel gear(s). In certain embodiments, gearbox 514 can drive multiple wheels 515 at once. In other or the same embodiments, gearbox 514 can include a differential.

In some embodiments, gearbox 514 transfers the power through a 90-degree change in direction. In certain embodiments, gearbox 514 can have several gearing ratios to increase the efficiency of motorized trolley assemblies 510. In some embodiments, gearboxes 514 and/or motors 512 are configured to bolt-on to motorized trolley assemblies 510 for ease of replacement.

Various parts of MTCC 300, including the side plates and cross beam connectors 513 of motorized trolley assemblies 510 can be constructed from various materials including steel plating. Exposed steel can be coated for anti-corrosion and anti-rusting. Various parts of MTCC 500, including the side plates and cross beam connectors 513 of motorized trolley assemblies 510 can be constructed from various standard structural shapes.

Load wheel assemblies 520 can include a shaft and bearing design. In some embodiments, the shaft and bearings are made of high-grade premium alloys. In some embodiments, load wheels 515 can be attached to a high-grade premium alloy normalized steel shaft which is press fitted into a cylindrical roller bearing assembly. Load wheels 515 can be secured to the shaft via a carbon steel end cap fastened with tapered head machine screws.

In certain embodiments, the cylindrical roller bearing assembly includes high speed roller bearings at each end fitted into a bearing support tube. The support tube can have carbon steel walls with end covers that are fastened at both ends via machine screws.

The friction surface of load wheel 515 can be made of a variety of materials depending on the properties desired. For example, for high demand applications the load wheel 515 can be made of, among other things, flame hardened forged carbon steel. In situations where noise should be minimized, or at least reduced, load wheels 515 can be a special steel alloy and/or have partial and/or complete coatings of natural and/or synthetic rubber(s)/polymer(s). In some embodiments, partial coatings can resemble tires. Load wheels can be coated with polyurethane. In some embodiments, load wheels 515 are pneumatic tires.

In some embodiments, MTCC 500 can utilize direct positive mechanical engagement or external assist for inclines and declines, via cables/ropes, gears, or chains drives when above 1 percent grade. In some embodiments, MTCC 500 can climb grades over 15%.

In some embodiments, load wheel 515 has an outside diameter of essentially 400 mm, although other sizes can be used as well.

In certain embodiments, load wheels 515 are configured to be easily removed from motorized trolley assembly 510 for maintenance and/or replacement. In some embodiments, this is accomplished via a bolt-on retaining flange.

In some embodiments, motorized trolley assemblies 510 has various guide wheels configured to keep load wheels 515 in an optimum, or at least improved, alignment with track 210. Guide wheels can be coated with, among other things, rubber and/or polyurethane. In some embodiments, guide wheels can be pneumatic tires. In the embodiment shown, top guide wheels 517 and bottom guide wheels 518 keep MTCC 500 aligned to track 210. Anti-tilt wheels 519 keep motorized trolley assembly 510, and therefore MTCC 500 as a whole, from tilting horizontally when load-shifting occurs.

In some embodiments, wheel clean-sweep plates 511 are mounted on either or both sides of MTCC 500 of some, if not all, load wheel assemblies 520 and provide for continuous removal of obstructions or debris that can accumulate on rail 205. In some embodiments, wheel clean-sweep plate 511 as a whole, or just the portion that moves over rail 205, can be made of a replaceable and serviceable high-density, synthetic material to remove obstructions. In some embodiments, wheel clean-sweep plate 511 is made of a steel plate. In some embodiments, wheel clean-sweep plate 511 can incorporate non-adhesive properties that allow for improved discharge of debris collecting on the face of wheel clean-sweep plate 511.

In some embodiments, motor(s) 512, particularly electric motors 512, can receive power-feed from power supply buss(es) installed along the main track. In certain embodiments, these power buss(es) can have corresponding and aligned power pick-up shoes on each motorized trolley assembly 510 for power transfer into the motors and/or for feeding regenerated power back into the system during deceleration, braking and track decline sections.

Kingpin(s) 516 can include a ball swivel top flange, designed with a thrust bearing, configured for descending through from the top, and out the bottom, of cross beam connector 513. Kingpins 516 can rotate within the allotted passageway and can have the ability to absorb vertical and lateral forces. In some embodiments, the lower end of kingpins 516 can have full-circle, eyelet-designed bracket through which a secondary pin is placed, thus joining it with the top of end beam 550. This configuration allows the system to be readily hooked and unhooked for service and maintenance.

In other embodiments, end beam 550 is directly connected to motorized trolley assemblies 510. This direct connection can be accomplished by, among other things, a steel universal joint, a steel eyelet-to-eyelet, or a steel hook-to-eyelet connection.

In some embodiments, bumpers are attached to trolley 510. In some embodiments, bumpers are symmetrically designed since MTCC 500 can operate bi-directionally. Bumper assemblies can be made of, among other things, spiral spring-loaded tubes with rubber externals or a similar shock absorbing material such as, but not limited, to leaf-springs or gas shock absorbers. In certain embodiments, bumpers are configured so that containers being carried by separate MTCC 500 cannot, or are at least less likely, to hit each other. Bumpers also help reduce, if not eliminate, damage caused by collisions between multiple MTCC 500 and/or external objects.

The spacing created by bumpers, can also aid in maintaining safety-rated weight distribution on over-head track 210 and support structure when MTCC 500 are in an accumulated state.

In some embodiments, trolleys 510 will move along the length of the track 210 to adjust for the different size of containers.

In some embodiments, the sequence of operation for change the MTCC 500 from arranged to move a container of a first length (for example, 20 ft) to a container of a second length (for example 40 ft) is as follows. Each of two trolleys 510 will move out from the center. When trolleys 310 reach a proper distance, each trolley 510 will stop.

In some embodiments, trolleys 510 will move to coordinate with shipping containers 220 of various lengths including, but not limited to 20 feet (6.1 meters), 30 feet (9.1 meters), 40 feet (12.2 meters), 45 feet (13.7 meters), 48 feet (14.6 meters) and/or 53 feet (16.15 meters).

In some embodiments, container engagement devices 560 are twist locks that connect directly to shipping containers 220 using the industry standardized four-corner pin locking system. In some embodiments, container engagement devices 560 are rotated electronically with dedicated electric motors. In some embodiments, a pair of container engagement devices 560 are turned with a linkage assembly powered by a single motor. In some embodiments, container engagement device 560 rotation can be driven by electric-driven linear actuators.

In some embodiments, a single MTCC 500 is configured to work with multiple sized shipping containers 220. In some embodiments, the length of shipping container 220 is a standard size such as, but not limited to, 20 feet (6.1 meters), 30 feet (9.1 meters), 40 feet (12.2 meters), 45 feet (13.7 meters), 48 feet (14.6 meters) or 53 feet (16.15 meters).

In some embodiments, MTCC 500 is configured to work under various external forces including, but not limited to, temperatures ranging from −30 degrees Celsius to 60 degrees Celsius, wind gusts up to 200 kilometers per hour, rain, sleet, hail, and/or snow.

FIG. 22 is a side view of motorized trolley container carrier 500 on track 210 with 40 ft shipping container 220.

FIG. 23 is a side view of motorized trolley container carrier 500 on track 210 with 20 ft shipping container 220.

Motorized trolley container carrier 500 also includes electronic controls. Electronic controls can be powered through a shoe and buss system, such as the one discussed earlier. In some embodiments, electronic controls include controls and power units. In some embodiments, the controls monitor and manage information from the sensor(s) located on the MTCC 500.

In some embodiments, track 210 is a monorail, separate from the support structure (steel or otherwise). In other or the same embodiments, track 210 is integrated with the structure (steel or otherwise). Although this device has been descried as being used with intermodal shipping containers, it can also be employed in other settings such as transporting passenger cars from ferries.

While particular elements, embodiments, and applications of the present invention have been shown and described, it will be understood, that the invention is not limited thereto since modifications can be made by those skilled in the art without departing from the scope of the present disclosure, particularly in light of the foregoing teachings.

What is claimed is:

1. A container carrier for transporting a container on a suspended railway extending in the longitudinal direction, said container carrier comprising:
    (a) a pair of trolley assemblies configured to move said container carrier along said suspended railway, each of said trolley assemblies comprising:
        (i) a support frame structure; and
        (ii) a first and a second pair of load wheels configured to ride along said suspended railway;
    (b) a carrier body suspended from said pair of trolley assemblies, said carrier body comprising:
        (i) a first set of beams extending laterally outwardly from an inner portion of said carrier body, each of said first set of beams having a first locking mechanism capable of mating with a first cooperating locking mechanism on a first container having a first length; and
        (ii) a second set of beams extending laterally outwardly from oppositely disposed outer end portions of said carrier body, said second set of beams having a second locking mechanism capable of mating with a second cooperating locking mechanism on a second container having a second length, said second length of said second container being greater than said first length of said first container.

2. The container carrier of claim 1, wherein said pair of trolley assemblies are motorized.

3. The container carrier of claim 1, wherein each of said trolley assemblies further comprises:
    (iii) first and second electric motors mounted on said support frame structure for inducing rotation of said first and second pairs of load wheels, respectively, along said suspended railway.

4. The container of claim 3, wherein said first and second electric motors employ a regenerative power system.

5. The container carrier of claim 1, wherein said first and second locking mechanisms are four-corner locking pin mechanisms.

6. The container carrier of claim 1, wherein said first and second locking mechanisms are twist locks.

7. The container carrier of claim 1, wherein said carrier body further comprises:
    (iii) a first and a second bumper extending longitudinally outwardly from oppositely disposed outer ends of said carrier body, said first and second bumpers being telescopically adjustable.

8. The container carrier of claim 7, said first and second bumpers are made of a shock absorbing material.

9. The container carrier of claim 1, each of said trolley assemblies comprising:
    (iii) a plurality of sweep plates mounted to said support frame structure, said plurality of sweep plates for preventing obstructions or debris from encountering said first pair of load wheels and said second pair of load wheels as said trolley assemblies traverses said suspended railway.

10. The container carrier of claim 1, each of said trolley assemblies further comprising:
    (iii) a pair of anti-tilt wheels mounted to said support frame structure, said pair of anti-tilt wheels inhibiting swaying or tiling of said container during load shifting within said container.

11. The container carrier of claim 1, wherein said first and second load wheels are made of carbon steel and coated with rubber.

12. The container carrier of claim 1, wherein said suspended railway is a monorail.

13. The container carrier of claim 1, each of said trolley assemblies further comprising:
    (iii) at least one pair of guide wheels.

14. The container carrier of claim 1, each of said trolley assemblies further comprising
    (iii) a first electric motor and a second electric motor mounted on said support frame structure for inducing rotation of said first and second pairs of load wheels, respectively, along said suspended railway.

* * * * *